United States Patent
Arpee et al.

[11] Patent Number: 5,926,762
[45] Date of Patent: Jul. 20, 1999

[54] CELLULAR TELEPHONE INTERFERENCE PREDICTION AND FREQUENCY REUSE PLANNING

[75] Inventors: John E. Arpee, Little Rock, Ark.; Eric H. Jensen, Livermore, Calif.; Eric A. Miller, Annandale, Va.

[73] Assignee: Internet Mobility Corporation, Pleasanton, Calif.

[21] Appl. No.: 08/648,998

[22] Filed: May 17, 1996

[51] Int. Cl.$^6$ .................................................. H04B 15/00
[52] U.S. Cl. ........................... 455/447; 455/63; 455/67.7
[58] Field of Search ................................ 455/33.1, 33.4, 455/39.1, 63, 62, 67.7, 134, 135, 67.1, 67.3, 446, 447, 450, 524, 525; 379/59

[56] References Cited

U.S. PATENT DOCUMENTS

| | | | |
|---|---|---|---|
| 4,384,362 | 5/1983 | Leland | 455/447 |
| 4,736,453 | 4/1988 | Schloemer | 455/67.3 |
| 5,179,722 | 1/1993 | Gunmar et al. | 455/67.7 |
| 5,293,640 | 3/1994 | Gunmar et al. | 455/446 |
| 5,307,510 | 4/1994 | Gunmar et al. | 455/33.1 |
| 5,375,123 | 12/1994 | Andersson et al. | 455/67.3 |
| 5,583,886 | 12/1996 | Rohani et al. | 455/33.1 |

*Primary Examiner*—Edward F. Urban
*Attorney, Agent, or Firm*—Stephen L. King

[57] ABSTRACT

A computer implemented process which includes furnishing data indicating the actual strengths of all signals to be transmitted by a plurality of cells each positioned at an individual physical position in a mobile communications system and to be received by a mobile unit at a plurality of points of an entire mobile communications system, relating data indicating the actual strengths of all signals to the physical positions from which the signals are to be transmitted, identifying cells transmitting signals likely to serve each point of the plurality of points, and comparing planned frequencies to be used at any position serving a point with planned frequencies to be used at other positions to identify cells transmitting signals which might interfere with signals transmitted by cells serving a point.

17 Claims, 5 Drawing Sheets

CELLULAR TELEPHONE INTERFERENCE PREDICTION AND FREQUENCY REUSE PLANNING

BACKGROUND OF THE INVENTION

1. Field of the Invention

This invention relates to cellular telephone systems and, more particularly, to computer implemented processes for predicting interference at mobile units between frequency channels provided by different base stations (cells) in a pattern of base stations.

2. History of the Prior Art

Presently available commercial mobile communication systems typically include a plurality of fixed base stations arranged in patterns in which each base station transmits and receives a number of frequencies. In the most prevalent American Mobile Phone System (AMPS) system, a frequency band of 25 MHz providing approximately four hundred different adjoining FM frequency channels has been allotted by the federal government to each cellular operator. A mobile unit within range of the base station communicates with the external world through the base station using these channels. In a typical system, each channel uses a FM frequency band width of 30 KHz. for downlink transmission from a base station (cell) to a mobile unit and another 30 KHz. for uplink transmission from a mobile unit to a cell. Typically, the frequencies assigned to the downlink transmissions for a cellular system immediately adjoin one another and are widely separated from the frequencies assigned to the uplink transmissions for a cellular system which also immediately adjoin one another. In this specification, even though widely separated, the pair of frequencies used for both downlink and uplink transmission are generally intended when reference is made to a channel unless the context indicates otherwise.

The channels used by a base station are separated from one another in frequency sufficiently that signals on any channel do not interfere with signals on another channel from that base station. To accomplish this, an operator typically allots a base station a set of channels with frequencies which are each separated from the next by some large number (e.g., twenty-one) channels carrying intermediate frequencies. Thus, in a system with twenty-one channel separation, one base station might have channels 1, 22, 43, 64, 85, and so on up to a total of from five to one hundred individual channels. So long as a mobile unit is within the area in which the signal from a base station is strong enough and is communicating with only that base station, there is no interference with the communications.

However, in order to allow mobile units to transmit and receive telephone communications over a wide area, each cell is normally positioned with its area of coverage adjacent and overlapping the areas of coverage of a number of other cells. When a mobile unit moves from an area covered by one base station to that covered by another, the communication is transferred from one base station to the other in an area where the coverage from different cells overlaps. Because of this overlapping coverage, the channels allotted to the cells are carefully selected so that adjoining cells do not transmit or receive on the same frequencies. The channels used by adjoining base stations are also supposedly separated from one another in frequency sufficiently that signals from any base station do not interfere with signals from another nearby base station. This is typically accomplished by assigning channels to some central cell which are widely separated in frequency in the manner described above, and then assigning channels to the cells surrounding that central cell using a pattern which increases each channel number by one for each sequential cell surrounding the central cell. Thus, if cells are arranged in a honeycomb pattern in which six cells surround a central cell using the above-described channels, a first cell adjacent to the central cell may have channels 2, 23, 44, 65, 86, and so on while a second cell adjoining the central cell may have channels 3, 24, 45, 66, 87, and so on. The pattern of channel assignments continues similarly in the other cells adjoining the central cell. It will be noted that separating each channel assigned to any cell from the next channel assigned to that cell in this manner allows a total of twenty-one cells having entirely different frequencies to be positioned in a system before any frequency must be repeated. The pattern is often called a frequency reuse pattern and may vary in many ways from the specific pattern described.

In some systems, especially those with cells in urban areas carrying heavy traffic, each cell is further divided into three sectors each of which may include channels having the above-described frequency allotment of channels. The antennas of each sector are typically arranged to provide 120 degree coverage. With slightly over four hundred channels available, this allows a repeating pattern of groups of cells in the beehive hexagonal arrangement described above with seven cells each having three sectors. When cells are discussed herein, sectors are normally meant as well unless the context indicates otherwise.

In theory, this form of cell arrangement and channel assignments allows the frequency reuse pattern to be repeated at distances sufficiently separated to negate interference between mobile units on the same and adjacent channels.

Unfortunately, interference does occur for a number reasons. Antenna patterns, power levels, scattering, and wave diffraction differ from cell to cell. Buildings, various other structures, hills, mountains, foliage, and other physical objects cause signal strength to vary over the region covered by a cell. Consequently, the boundaries at which the signal strength of a channel falls below a level sufficient to support communications with a mobile unit vary widely from cell to cell. For this reason, cells adjacent one another do not, in fact, typically form the precise geometric boundaries suggested above. Since cell boundaries must overlap to provide complete coverage of an area and the boundaries of cells are imprecisely defined, overlapping coverage often occurs between channels which might interfere with one another.

For example, the transferring of a communication with a mobile unit from one cell to another is accomplished by a process referred to as a "hand-off." Each cell site has a scanning receiver which measures signal levels sent from a mobile unit. When the received signal strength falls below a threshold level, a cell connected to a mobile unit sends a message to a switching center which controls the area covered by the cell. The switching center includes software which maintains data tables which list the switching thresholds, channels assigned to cells, and the positions of the cells in the system. The switching center sends a message to the neighboring cells which overlap the cell connected to the mobile unit asking the neighboring cells to use their scanning receivers to measure the signal level being sent by the mobile unit on the particular channel. The neighboring cells each measure the signal level and also measure some identification signal (e.g., a supervisory audio tone (SAT) which is sent in an AMPS system on the channel at a frequency above the level of the audio of the mobile channel) to identify the signal from a particular mobile unit.

All of the cells report back the signal levels received to the switching center. The switching center software determines whether any neighboring cell is receiving a stronger signal from the mobile unit than the cell presently carrying the mobile transmission. If a cell is receiving a significantly stronger signal (set at a value determined by the switching software), the switching software signals the serving cell to notify the mobile unit to switch to a new channel. The switching software sends another message to the neighboring cell receiving the stronger signal telling it to commit a new channel to the mobile. The first connection is disabled, and the mobile unit tunes to the new channel.

To carry out this hand-off process, the signal levels provided at the boundaries of adjacent cells must each be strong enough to support transmission; or the transmission with a mobile unit will be interrupted. Since the pattern around each cell defined by the signal strength just insufficient to support transmission with that cell is not a neat geometric shape, overlapping occurs in widely varying patterns.

The odd shaped boundaries of the individual cells and the necessity that the cells overlap means that signals on the same channel will often interfere with one another even though they are generated by cells which are at distances theoretically sufficient to eliminate interference. This is especially true when a sectored cell pattern is used because the cells are much closer to one another than in a simple cell pattern. A first signal on a channel from a remote cell interferes with a second stronger signal carrying a mobile transmission on the same channel within the coverage area of a cell when the drop in strength of the first signal from the second signal is less than some threshold level (typically measured in decibels). Moreover, signals on adjacent channels are carried by abutting cells in accordance with the above-described frequency reuse pattern. Typically, frequency filtering is insufficient to eliminate adjacent frequencies entirely; consequently, there may be adjacent channel interference. A signal from another cell on a channel at a frequency adjacent the frequency of a channel carrying a mobile transmission interferes when the strength of the adjacent channel signal is greater than a second threshold level compared to the second signal. when the drop in strength of the interfering signal from the serving signal is less than some second usually higher threshold level; normally an adjacent channel may be closer in strength to a serving channel because frequency filtering eliminates some substantial portion of the adjacent frequency signal.

In order to overcome interference when designing or improving the coverage of a mobile cellular system, it has been typical for a cellular system operator to use predictive software to determine what signal strength is to be expected from each of a particular set of cells. This software utilizes data describing the physical characteristics of the terrain surrounding each cellular site and the physical characteristics of the cellular station to plot expected signal strengths around a cellular site. These signal strength predictions are then overlaid on a graphical plot to determine where antennas should be placed to provide optimum coverage with appropriate overlapping areas for hand-offs. Deciding upon optimum coverage may require that the operator move the points at which individual cells are positioned and use the predictive software to replot expected signal strengths around a cellular site to eliminate expected interference. Once the antenna sites have been determined, the operator assigns channel groups to the cells in accordance with the technique described above.

It is possible that expected interference cannot be eliminated by overlaying signal strength predictive plots; and the operator may place test antennas in position using the results of these predictive mappings and test to determine if actual interference exists. Alternatively, the predictive plots may predict that no interference is likely to occur, and the operator may place the antennas to be used in the system. The operator may later find that interference, in fact, occurs at some positions and test to determine how to eliminate the interference. The determination of whether interference actually exists and where it exists is made by drive tests which measure signal strength of channels at the positions either where a graphical plot shows that interference might occur within the cellular system area or where interference has been reported. Since the predictive software provides only an educated guess at the actual signal strengths produced by the channels at a cell, the points at which interference is predicted are often inaccurately placed. In fact, the predictive software provides an estimation of signal strength with a typical error having a standard deviation of 8 dB. This error is very large compared to the required design tolerances which may range from 3 dB to 17 dB.

During the drive tests to determine actual interference, a single channel at each cell or sector of a cell involved in the interference testing is enabled. A mobile unit with a scanning receiver drives over the roads and highways of the system. The scanning receiver scans and measures the strength of the frequency transmitted by each cell at the points of possible interference as the mobile unit moves. This provides strength measurements of signals generated by each cell at each test point. These strength signals are then plotted on the graphical plot against the cells from which they are believed to emanate. Thus, the expected interference points on channels from different cells which actually interfere with one another may be viewed graphically to determine whether sufficient interference exists to change the channel group assigned to the particular area. As may be seen, this requires a substantial amount of time and limits the interference determination to those points at which a system operator expects to find interference, an expectation the accuracy of which is very suspect.

If the number of points of interference for a cell are sufficiently great, the patterns of channels are changed. That is, the frequency group assigned to a cell (or cells) is typically changed in its entirety to another frequency group in which channels which would interfere with channels carried by other cells do not occur. Sometimes, interference may be eliminated by changing the cell characteristics (such as antenna tilt or power used in particular cells) without changing the channels used. Once channels have been assigned to cells which provide acceptable coverage and expected interference has been eliminated, the system is fixed and operated.

This method of placing cells, assigning frequencies, and eliminating interference is quite slow and labor intensive. Moreover, it does not provide a complete understanding of interference which actually exists in a system since typically only those positions at which prediction software leads the operator to believe that interference may exist are tested to determine whether interference actually exists. In addition, whenever the physical pattern of individual cells in a system changes, the computation of predicted cell coverage, graphical plotting of predicted cell coverage, drive testing to check actual interference, actual interference plotting, and assessment of actual interference takes place over again. This is a very labor intensive process which greatly increases the costs of creating and maintaining mobile systems without guaranteeing that interference will be eliminated. Because of the emerging nature of the market for cellular telephones, those system changes are taking place constantly and at an accelerating rate.

It is desirable to provide a process by which interference between cellular telephone system channels operating at the same frequency and adjacent frequencies may be accurately predicted over each entire cell of an entire system before physical changes are made to the system.

It is desirable to remove most of the labor intensive operations in the prediction of channel interference from the design of cellular telephone operating systems.

SUMMARY OF THE INVENTION

The present invention is realized by a computer implemented process which includes furnishing data indicating the actual strengths of all signals to be transmitted between a plurality of cells each positioned at an individual physical position in a mobile communications system and a mobile unit at a plurality of points of an entire mobile communications system, relating data indicating the actual strengths of all signals to the physical positions from which the signals are to be transmitted, identifying cells transmitting signals able to serve each point of the plurality of points, comparing planned frequencies to be used at any position serving a point with planned frequencies to be used at other positions to identify cells transmitting signals which might interfere with signals transmitted by cells serving a point, and determining whether planned frequencies to be used at any position serving a point interfere with planned frequencies to be used at other positions over the entire mobile communications system.

These and other features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
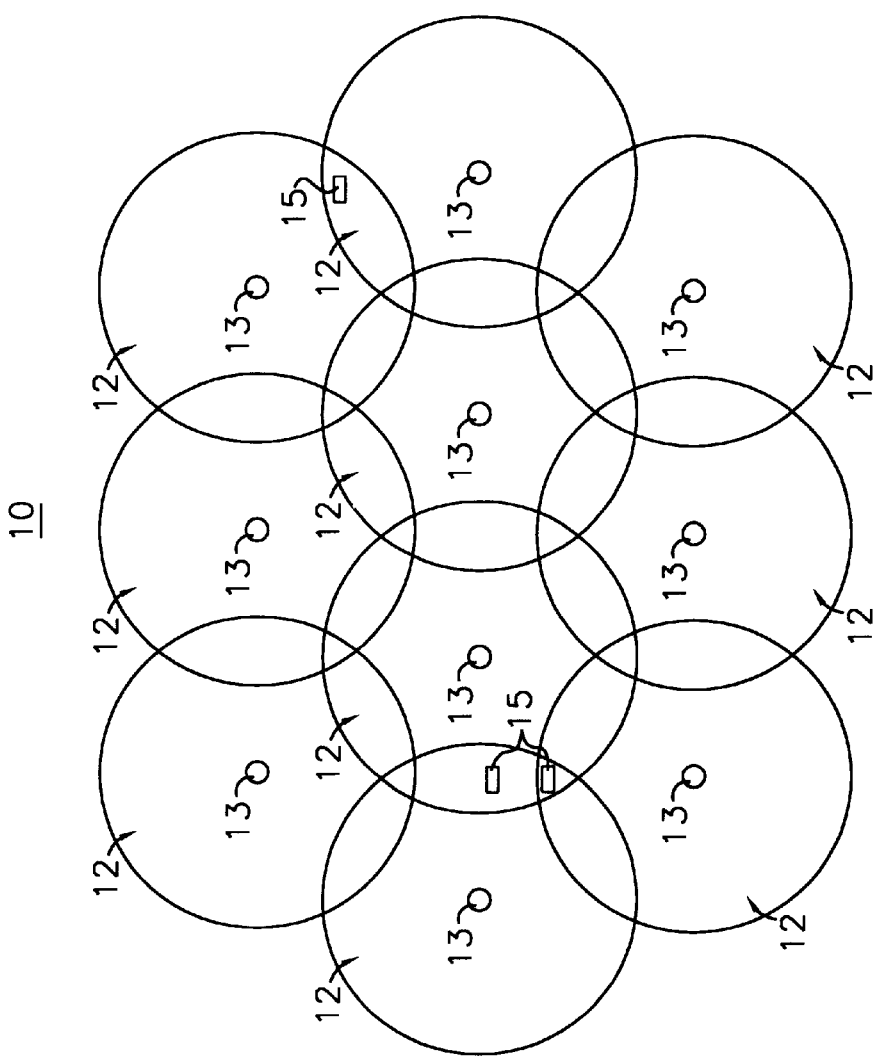
FIG. 1 is a drawing depicting an idealized mobile cellular telecommunications system.

Referring now to FIG. 1, there is illustrated a cellular telephone system 10 which includes a number of individual cells 12 arranged in an idealistic honeycomb pattern. Each of the cells 12 includes at least one base station 13 which transmits and receives communications on a number of assigned frequencies with mobile units 15 operating within its service area. The frequencies which are chosen are separated sufficiently that signals from any base station do not interfere with other signals from that base station. In FIG. 1, the service area of the ideal cell 12 is defined by an outer solid boundary which indicates the limits of the area in which the signals from that cell 12 are strong enough to serve a mobile unit 15.

As may be seen in FIG. 1, in order to allow mobile units to transmit and receive telephone communications over a wide area, the service area of each cell 12 overlaps the service areas of a number of surrounding cells 12 so that within these overlapping areas either of two or more cells 12 might serve a mobile unit 15. The channels allotted to the individual cells and the frequency reuse pattern are carefully selected so that adjoining cells do not transmit or receive on the same frequencies in these overlapping areas over an entire cellular system.

Figure 2:
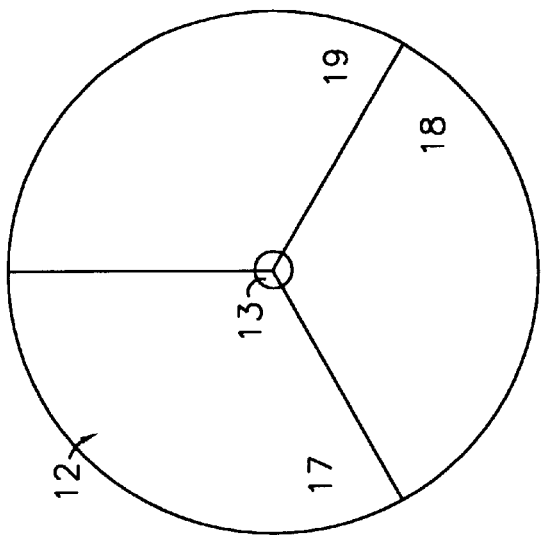
FIG. 2 is a drawing illustrating a single cell site divided into three individual sectors for transmitting and receiving communications.

In some arrangements as shown in FIG. 2, especially cells used in urban areas carrying heavy traffic, each cell 12 is further divided into three sectors 17, 18, and 19 each of which may include channels allotted as described earlier. The antennas of each sector are arranged to provide 120 degree coverage. With slightly over four hundred channels available to each cellular system, this allows a repeating pattern of groups of cells in the beehive arrangement of FIG. 1 with seven cells each having three sectors each of which has approximately twenty channels.

Unfortunately, the boundaries at which the signal strength of a channel falls below a level sufficient to support communications with a mobile unit vary widely from cell to cell. For this reason, cells adjacent one another do not, in fact, typically form the precise geometric boundaries suggested above but form a boundary patterns such as those illustrated in FIG. 3.

Since it is necessary that each cell 12 (or sector of a cell 12 if the cell is divided into sectors) have sufficient power to transmit and receive signals with a mobile unit 15 in the overlapping areas of cell coverage in order that hand-off of a transmission from one cell to another may occur when a mobile unit is passing from the area serviced by one cell to an area serviced by another cell, it is possible that channels used by different cells will interfere with each other in these overlapping areas. As has been pointed out, channels which may interfere with one another are channels using the same frequency (co-channels) and channels on frequencies immediately adjacent to a serving channel. Thus, the problem to be solved in assigning cell sites and establishing a reuse pattern is to assure that channels which might interfere with one another are not present in overlapping areas. This is relatively simple given the ideal system such as that illustrated in FIG. 1.

Figure 3:
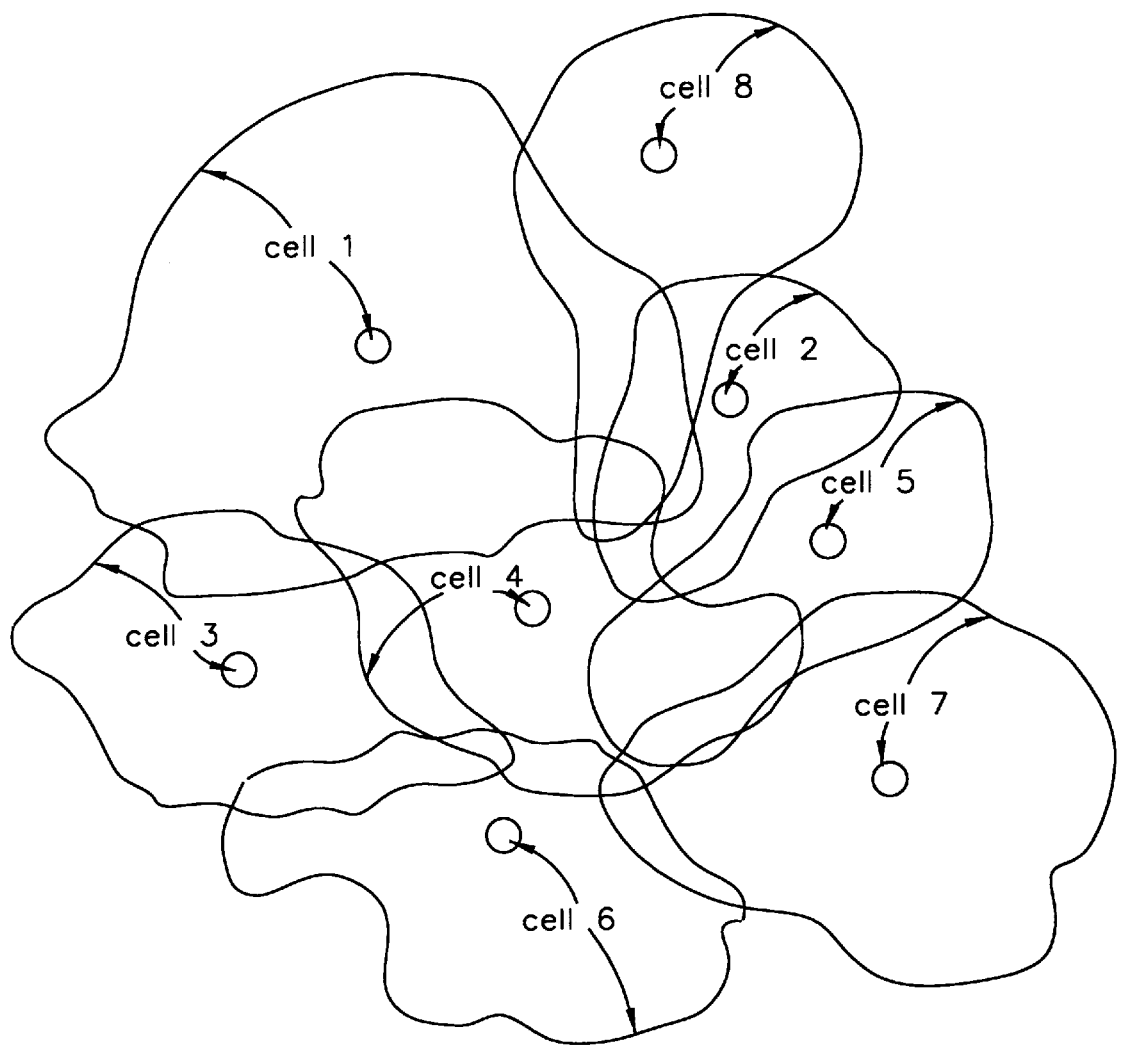
FIG. 3 is a drawing depicting a portion of a more realistic mobile cellular telecommunications system than that illustrated in FIG. 1.

However, in the more realistic system illustrated in FIG. 3, it will be seen that areas of coverage by different cells overlap not only where the cell sites are immediately adjacent one another but at greater distances. For example, coverage provided by cell 4 (in FIG. 3) is overlapped by coverage provided by each of adjoining cells 1, 2, 3, 5, 6, and 7. This overlap is normal and allows hand-off to occur when a mobile unit moves from the area covered by cell 4 to any of the immediately adjoining areas of coverage. However, coverage provided by cell 4 is also overlapped by non-adjoining cell 8. If the cells of FIG. 3 are divided into sectors each covering 120 degrees, then the frequencies of channels assigned to the overlapping areas in adjoining cells may cause adjacent channel interference. Moreover, the sectors of cell 8 may be assigned channels which cause co-channel interference with the channels of cell 4 in a typical frequency reuse pattern. Similar interference problems exists with respect to other cells in the cellular system which are not shown in FIG. 3.

Because the coverage offered by different cells differs so drastically, it has been typical for a cellular system operator to use predictive software to determine what signal strength is to be expected from each of a particular set of cells. This software uses input data describing the physical characteristics of the terrain surrounding each cellular site and the physical characteristics of the cellular station to generate signal strength coverage plots for the area surrounding a cellular site. These predictive patterns are then overlaid on a graphical plot to determine antenna positions which provide optimum coverage with minimum interference. Once the sites have been determined, the operator assigns channel groups to the cells in accordance with the technique described above. This is followed by actually placing antennas in position using the results of these predictive mappings. Once the antenna locations are identified and the frequencies are assigned, the operator determines from the graphical plots where interference is likely to occur and conducts tests to determine whether interference, in fact, occurs at those positions.

The determination is made by drive tests which measure signal strength of channels at the positions where the graphical plot generated by the predictive software shows that interference might occur within the cellular system area. Since the predictive software used presumes general characteristics derived from similar terrain and cells to determine cell coverage, overlap such as the overlap of cell 8 into the boundaries of cell 4 illustrated in FIG. 3 is often not predicted. Consequently, signal strength measurements of test frequencies generated by each cell are taken only at the test points where interference is expected and may entirely miss interference which actually occurs. These signal strength measurements are then plotted on the graphical plot against the cells from which they emanate. As may be seen, this process requires a substantial amount of time and limits the interference determination to those points at which a system operator expects to find interference.

If the points of interference are sufficiently great, the groups of channels assigned to the cells are changed. This is accomplished by determining at any point whether interference greater than an acceptable level exists. If interference exists, it may be tested again by more drive tests. However, if interference is ultimately found to exist in an area which is expected to carry significant traffic, the groups of channels assigned to the cells are changed. The frequency group assigned to a cell (or cells) is typically changed in its entirety to another frequency group in which channels which would interfere with channels carried by the other cells do not occur. Sometimes, interference may be eliminated by changing the cell characteristics (such as antenna tilt or power used in particular cells) without changing the groups of channels used. Once channels which provide acceptable coverage have been assigned to cells and expected interference has been eliminated, the system is fixed and operated.

This operation is slow, labor intensive, and does not provide a complete understanding of interference which may actually exist. Moreover, whenever the physical pattern of individual cells in a system changes, the generation of predictive patterns of probable cell coverage, the graphical plotting of expected cell strength patterns, the drive testing to determine whether expected interference actually exists, the plotting of actual interference determined by the drive tests, and the assessment of interference takes place over again. This is a very labor intensive process which greatly increases the costs of creating and maintaining mobile systems without guaranteeing that interference will be eliminated.

The present invention overcomes the problems of the prior art by providing a process by which measured signal level data for an entire system is utilized to provide predictive plots which may be utilized to establish cell site positions and channel assignments. The process allows plots and channel assignments to be easily changed at minimal cost whenever a system undergoes changes or is updated.

In one embodiment, the process begins with a drive test of the entire system area. In the drive test for this embodiment, a single channel at each projected cell site or sector of a cell is transmitted; and a different channel is transmitted by any other cell in the test area. If an entirely new system is being designed, expected cell sites may be selected in any of a number of different ways such as by use of prior art predictive plotting software; and then test transceivers may be placed at the proposed cell site positions. If a cellular system already exists, then the cell sites which exist may be used along with any proposed new test sites. A mobile unit with a scanning receiver drives over all of the roads and highways of the area to be changed in the system. The roads include those which make up all of the most likely reception points of the entire communication system. Thus, it would not be necessary to drive four wheel vehicle trails unless it was expected to serve mobile units on those trails. The scanning receiver constantly scans and measures the strength (usually received signal power) of each channel transmitted from each of the cell sites as the mobile unit moves. The mobile unit also includes equipment (such as Loran or Global Positioning System (GPS) equipment) which constantly records the position of the mobile unit as each set of strength measurements is taken. This provides strength measurements of frequencies generated by transmitters at all of the cell sites proposed to be included in the system which can be received at any point in the service area over which the mobile unit drives. By transmitting from each cell on a single channel, interference which might complicate the readings is eliminated; that is, none of the transmitted signals should interfere with any other transmitted signal so that the cell from which any channel is transmitted is positively known. These signal strength measurements are recorded in a database with the position at which they were recorded by equipment in the mobile unit as the test continues.

The data in the database is then compared with data which indicates the characteristics of the cells (especially the channel being transmitted by each cell) during the test. This generates a database which indicates the cell or sector from which each signal received by the mobile unit was sent. The database may be used to generate a graphical plot of the actual signal strengths of each of the cells (or sectors) in the cellular system. The signal strength pattern if plotted from points taken over the entire area could be made to produce a plot such as that illustrated in FIG. 3. In any case, the cellular strength graphical plot will illustrate actual, rather than projected, signal strengths.

It should be noted that if the signal strength data for an area is compiled from more than a single drive test, the data from all of the drive tests must be combined so that the data of each drive test matches that of other drive tests. Thus, for example, if higher transmission power was used in one drive test than in another, then the strength values would need to be scaled (typically linearly) to provide data having the same significance. The data collected from one drive test may also be "combined" with previously collected data from other drive tests if the new data represents only a portion of cells in the network. This step is useful when economics or operational issues preclude collecting data for the entire network or proposed network all at once. Combining is also useful when adding new cells to a network so that the effect of new cells may be determined without having to re-collect data for the entire network.

Because the measuring process is not strictly controlled, data collected in different drive tests will be at slightly different locations even though the same routes are driven. The combination process uses a variety of methods to relate data samples that are near each other from differing drive tests and create a composite data sample. In one embodiment, each data sample is combined with other data samples within one hundred feet of each other. Redundant channel measurements are averaged together. In another embodiment a propagation model is used to interpolate missing channel measurements from channel measurements near the current location. At this point, the process compares the data for each channel received at each point in the entire area with the data for all other channels received at the point to determine at any point which cells should serve the point. These cells are called "likely servers." A number of criteria may be used.

A cell is a likely server at a particular location if there is a non-trivial probability that a cell will provide the transmission path to or "serve" a mobile unit at that location. The methods used to determine likely servers can be simple or very complex. Given below are three likely server methods. More are possible.

The simplest likely server method identifies as likely servers all cells that serve a location with a signal strength within 3 dB of the strongest signal strength for that location. A more advanced likely server method accounts for signal path imbalances which have been discovered caused by network hardware and software settings to determine likely servers for each location. Such a method may balance the uplink and downlink strengths where they vary, may bias certain strength determinations in favor of particular cells, or provide other adjustments to match the particular area of the system. A third likely server method provides specific tests for each different type of network hardware and accounts for network configuration and control information (e.g. how mobile unit hand-off is performed) as well as signal path imbalances to determine likely servers for each location.

For example, using the first of these methods, the strongest frequency is chosen from a group of all channels within 3 dB. of the strongest channel at each point. In general, all channels transmitting at any cell provide, on an average, signals of the same strength at any given point so long as the test frequencies of the channels are within approximately ten percent of the frequencies to be used. Thus, the strongest frequency at a point typically designates the cell to serve that point; while frequencies transmitted by adjoining cells received at the point within the 3 dB. range typically define a hand-off (overlap) area. Other more sophisticated methods of selecting a cell to serve a point may be used to force traffic onto a certain cell, for instance.

The relationships of the signal strengths of the likely servers at each test position in the cellular system from all of the cells are then associated with the channels proposed for each cell to determine if the proposed channel selection causes either co-channel or adjacent frequency interference. The cells serving the points of an area are known, and the proposed channel selection data for each of the cells or sectors may be associated with those cells. Since the points at which any particular channel transmitted from one cell will have a certain strength and may interfere with signals from another cell may be determined from the signal strength data which has been collected, such a determination may be made for each proposed channel for any drive test. The determination is usually made by subtracting the signal strength in dB of each signal received at each point on a channel which might interfere with a channel carried by the cell serving the point from the signal strength of the signal serving the point in dB. The desired cell serving at each point has already been determined from the test to determine cells serving a point. For co-channel interference in the AMPS system, if the difference is less than 17 dB, interference exists. For adjacent channel interference in the AMPS system, if the difference is less than from 3 to 6 dB. (depending on the criteria used), interference exists. If there is interference at any point in the system, the pattern of channel assignments and other cell configuration information (such as effective radiated power (ERP)) may be changed; and the actual signal strength database may be run against the new cell channel assignments. This requires no new testing or other operations by the operator, simply running the software until channel selections which exclude interference are determined.

Figure 4:
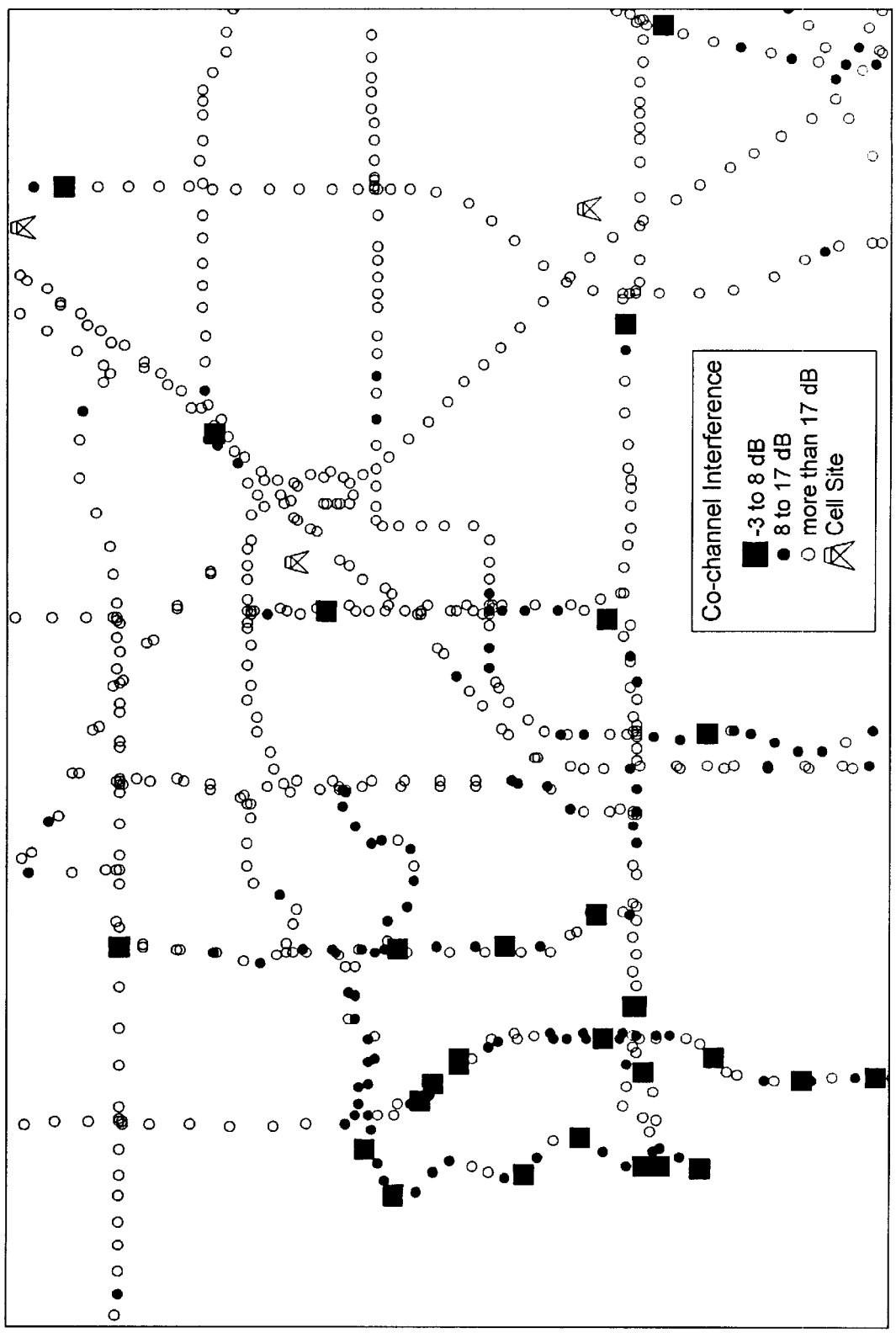
FIG. 4 is a graphical view of signal strength data obtained in drive tests for evaluating the arrangement of cells and channels within cells in a system such as that of FIG. 1.

A plot like that illustrated in FIG. 4 showing this possible interference information may be prepared which illustrates the points at which interference would occur were the proposed channels to be utilized in the system.

Figure 5:
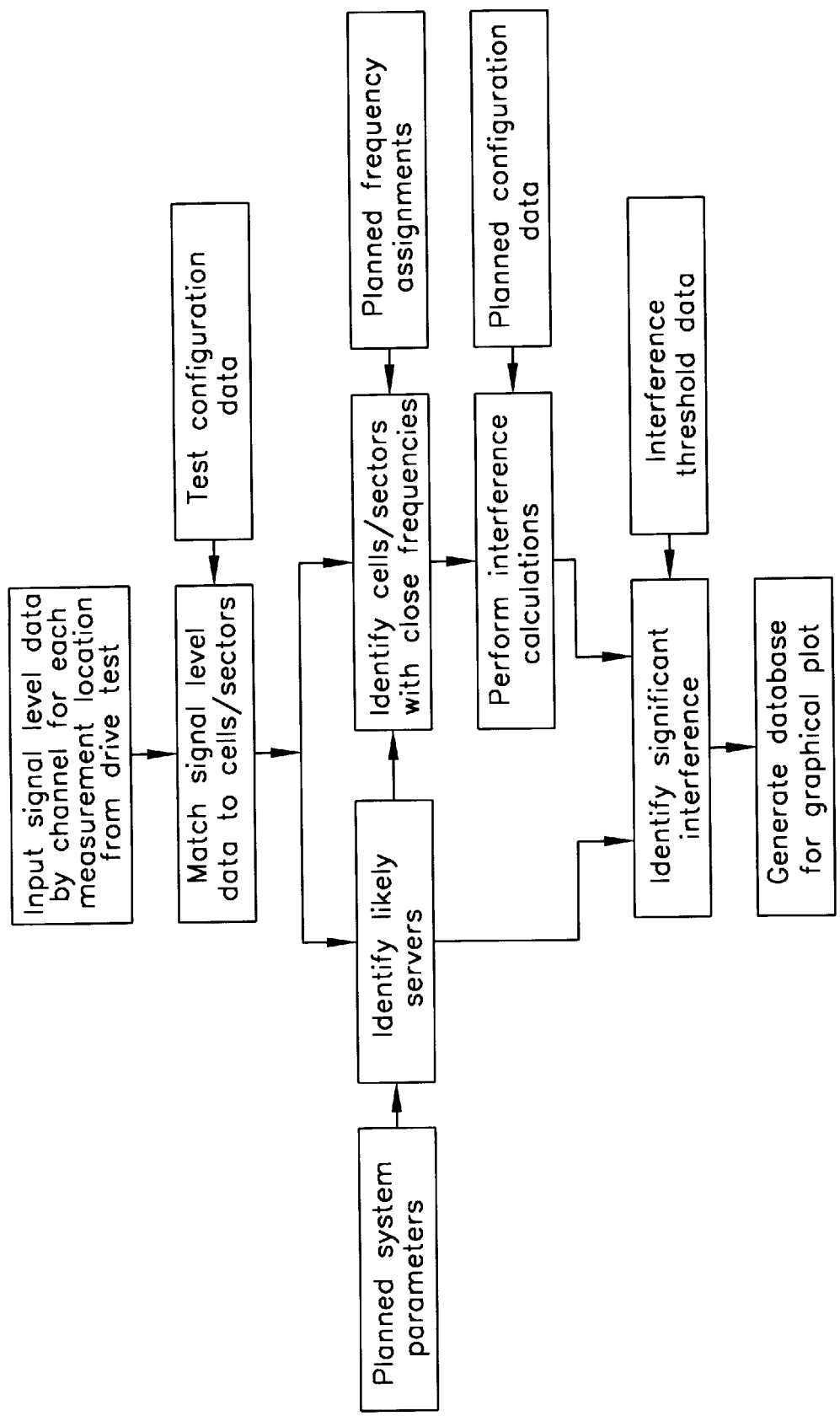
FIG. 5 is a flow chart illustrating a process in accordance with the present invention for predicting interference in a system such as that illustrated in FIG. 1.

Not only may the inventive process be used to update or plan a new system, the process also allows signal strength measurements derived from drive tests conducted using a particular type of cellular system such as an American Mobile Phone System to be used for determining coverage and interference patterns for cell sites which utilize entirely different types of systems. This has the advantage of allowing drive test results accumulated from an older system be used to predict interference which may occur in newer types of systems which might be installed at the same sites. The same signal strength test results may be utilized as a system is changed in any manner. The new channel assignments may be tested by the software against the signal strength measurement database to derive new predictions of interference. If additional cells or sectors are to be added, this may be accomplished by drive tests for signals from the new cells only. These may be added to the signal strength measurement database and the updated database used to determine new channels to be used. The cost of placing cells and assigning channel groups is reduced drastically by use of the process of the present invention FIG. 5 is a flow chart illustrating in detail the operation of one embodiment of a process in accordance with the present invention. As may be seen, data representing the actual signal strengths of frequencies received at each position on the streets, highways, and roads of a cellular system area at which a drive is reasonably able to be conducted is furnished as input to the program. This drive test data typically includes the signal strength of all frequencies measured at each position of the drive tests. Each data point may also include a time of test indication, the channels received, the geographic coordinates of the test point, and a list of the signal level measurements taken. In a particular case, the list may include the level of all channels received at the point or a list of the level of all channels received at the point which are over a particular level.

The drive test information is compared with a database indicating the channels which were functioning at each cell during the drive test. This database may also include power levels, antenna direction, and other significant data regarding the test configuration which may be compared later in the program to determine whether changes in these factors may be changed so that signals received on frequencies planned to be used will not actually interfere. This provides a signal level matched to cell or sector output database. The signal level matched to cell or sector output database is transferred to a process which identifies the likely servers for each signal position. This process may be of any of a number of different types. For example, it may determine for any geographic position which cell provides the strongest signal and use that as the likely cell to serve the position. It may then also include all other cells which provide signals having a strength within 3 dB of the strongest signal. On the other hand, the process may manipulate the signals received to utilize a particular cell in a particular area whenever possible in order to direct traffic to a particular cell or sector.

The signal level matched to cell or sector output database is also transferred to a process which reviews the frequencies at each point and introduces the planned frequency assignment data for cells servicing the point to determine frequencies which might interfere. Those frequencies which might interfere are then transferred to a process which compares the signal levels of channels serving a point to signals levels of interfering signals. This latter process may utilize input data defining configuration data for each of the cells including planned power levels and antenna tilt. The result of the process is an interference level calculation for frequencies which serve any point of the cellular system.

The results of this process are transferred to a process which utilizes the interference threshold algorithms to determine whether any interference is significant. The result is a database which may be graphically plotted to show the cellular system with all significant interference. Any significant interference points may then be eliminated by providing new channel selections for the cells to replace the previously planned frequency assignments and running the program again. Various characteristics of the cells may also be changed to determine the effect on interference. This process may continue until significant interference is eliminated.

A second embodiment of the invention provides substantial economies over the first embodiment in situations in which a new system is being designed. In this second embodiment, when a system is being planned, general areas in each of which a site might be positioned are first determined in some manner. For example, this may be done by using prior art predictive software as in the previous embodiment. A problem encountered in designing new systems is in selecting one particular position for a site from a number of possibilities in the same general area where a number of different positions may appear feasible. In order to determine which position is better suited before acquiring the site, the method of the first embodiment of this invention would conduct drive tests with transmitters placed at each of the possible sites. Such a drive test for each of the individual sites might take as long as one day if a number of individual positions are possible at each site. Thus, for an entire area, drive tests might take many days.

Figure 6:
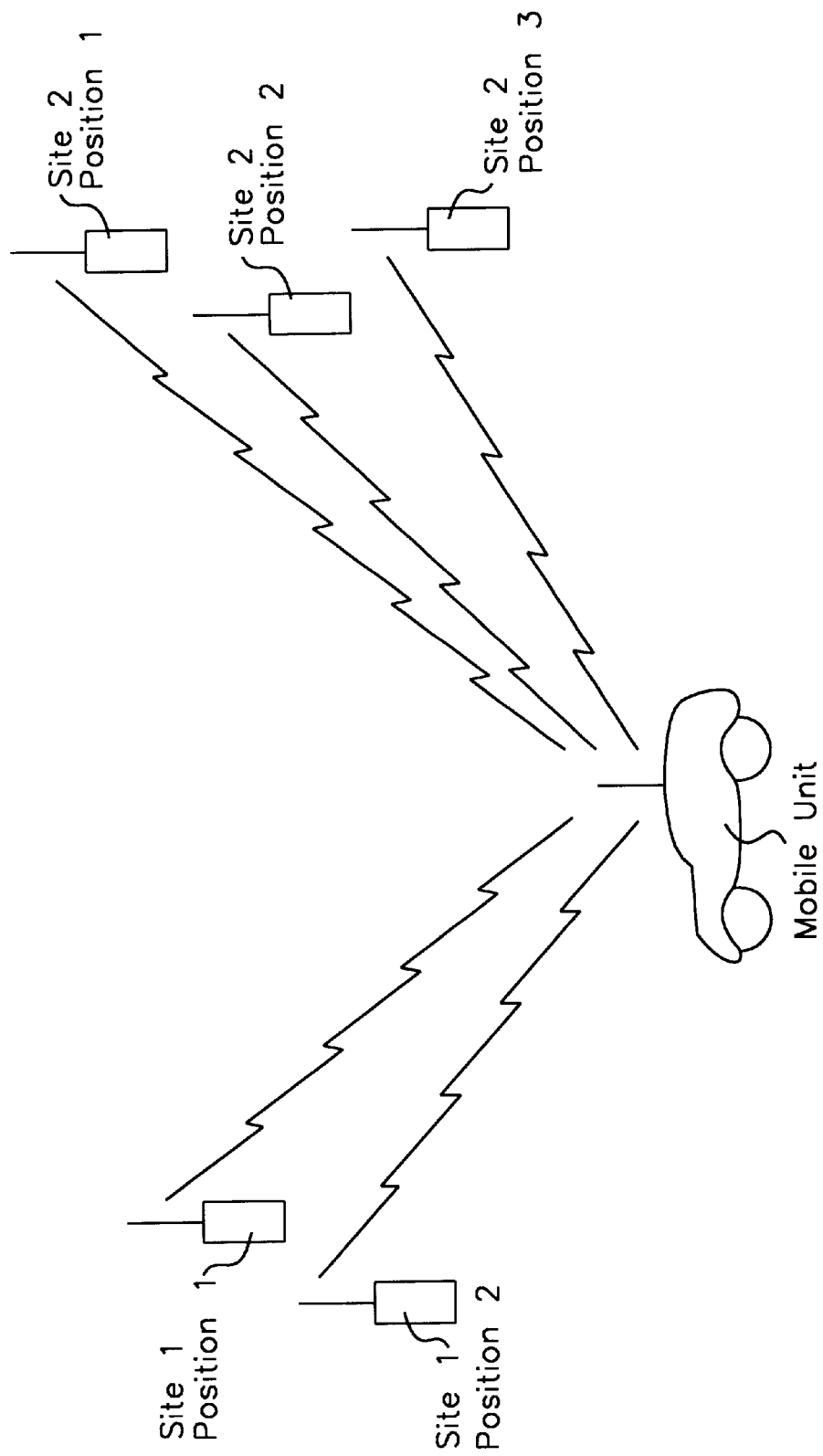
FIG. 6 is an illustration of the manner of practicing a second embodiment of the invention.

In the second embodiment which is generally illustrated in FIG. 6, the drive tests are conducted by placing a single transmitter in a mobile unit and using fixed receivers (rather than expensive scanning receivers) at all of the proposed positions at each of the sites over an extensive area for which new cells are proposed. The mobile unit drives over the roads encompassed by the new cells transmitting on a single frequency while all of the receivers attempt to detect the transmission. The power level transmitted by the mobile antenna is measured at the mobile unit once or more times sufficient to assure that it is known accurately. A GPS or other positioning system is linked to the mobile unit to provide position indications at each point of measurement. The transmitter sends a signal at the selected frequency, and all of the receivers measure its strength. The position indications of the mobile unit may be transmitted by the mobile unit with each of the test transmissions and received by the receivers at the proposed sites. Alternatively, the positions may be recorded in a database by the mobile unit with the times of the transmissions; and the times of reception may be recorded by each receiver with the signal strength received (e.g., using computers connected to record the signal strengths received at each proposed site). The signal strength received at a cell site from the mobile transmitter in an uplink transmission is on an average the same as the signal strength which would be received at a mobile unit from a cell site in a downlink transmission. If the downlink transmission is at a different effective radiated power than the uplink transmission used for collecting data, the collected data is adjusted by simply multiplying one or the other to compensate. Consequently, the data gathered by the drive test in this second embodiment may be directly substituted for the data gathered in the drive tests for the previous embodiment.

However, the drive tests of the second embodiment provide significant economic advantages over those used in the first embodiment. First, scanning receivers need not be used since only a single frequency is used for all transmissions to the sites. Scanning receivers presently cost approximately $20,000 compared to $2000 each for fixed receivers. However, each receiver would require computer equipment for recording the data thereby raising the per receiver site price to about $6000. Only a single test transmitter is necessary instead of transmitters at each of the sites; these transmitters cost approximately $17,000 apiece. Thus, the cost for each cell site position would be reduced from $17,000 to $6000 while the cost of the mobile unit equipment not including computer equipment needed in either case would drop slightly from $20,000 to $17,000.

More importantly, an entire area could be covered in a single drive test since the number of frequencies available does not limit how many stations may be tested at once. The only limit to the testing is the distance of stations from the mobile unit. Thus, labor costs are substantially reduced. Consequently, a single drive over the entire area is all that is necessary to both select a site and to gather all of the data necessary to accurately determine interference between all of the stations of the area being planned. If enough test equipment is used, by using more than one mobile unit and different frequencies for the different mobile units and for the sites which each mobile unit tests, an entire system may be tested in a single day compared to the weeks of testing required by prior art methods.

In determining labor costs, it should be noted that test transmitters normally require some time to warm up and stabilize; two hours of adjustment is a good average. With a transmitter at each possible position at each site, labor costs for this stabilization time are very significant. On the other hand, labor costs for the single transmitter in a mobile unit are comparatively insignificant.

The data, once gathered using this second embodiment, is utilized in a manner essentially identical to the method of the first embodiment. The method illustrated in FIG. 5 may be utilized in the same manner.

As has been illustrated, the invention offers a number of substantial advantages over the prior art. This process allows the complete testing of a system frequency plan before any changes are made in the physical structure of a cellular system and essentially eliminates the time consuming human element from the process of determining interference between channels. The process also allows a complete determination of actual interference over the entire cellular system to be conducted within a very short period of time and eliminates most unsuspected interference.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer implemented process for assigning channels to cells in a reuse pattern comprising the steps of:
    furnishing data indicating the strengths of signals in the absence of other signals on the same channel transmitted from a plurality of transmitters each positioned at an individual physical site in a mobile communications system and received at a plurality of points over an entire mobile communications system,
    relating the signals received to the physical sites from which transmitted, identifying sites transmitting signals likely to serve each of the plurality of points,
    comparing planned reuse channels to be used at any site serving a point with planned reuse channels at other sites to identify sites transmitting signals which might interfere with signals transmitted by sites serving a point, and
    furnishing an interference plot, based on comparing planned reuse channels, of generated signals from cells which actually interfere with signals from different cells over the entire mobile communications system.

2. A computer implemented process as claimed in claim 1 in which the step of comparing planned reuse channels to be used at any site serving a point with planned reuse channels at other sites to identify sites transmitting signals which might interfere with signals transmitted by sites serving a point comprises:
    comparing the strengths of signals of the same planned reuse channel received at a point to determine whether the strength of a possibly interfering signal is sufficient compared to a strength of a signal serving the point to interfere with the signal serving the point.

3. A computer implemented process as claimed in claim 1 in which the step of comparing planned reuse channels to be used at any site serving a point with planned reuse channels at other sites to identify sites transmitting signals which might interfere with signals transmitted by sites serving a point comprises:
    comparing the strengths of signals of adjacent frequencies received at a point to determine whether a strength of a possibly interfering signal is sufficient compared to a strength of a signal serving the point to interfere with the signal serving the point.

4. A computer implemented process as claimed in claim 1 in which the step of comparing planned reuse channels to be used at any site serving a point with planned reuse channels at other sites to identify sites transmitting signals which might interfere with signals transmitted by sites serving a point comprises:
    comparing the strengths of signals of the same reuse channels received at a point to determine whether the strength of a possibly interfering signal is sufficient compared to a strength of a signal serving the point to interfere with the signal serving the point, and
    comparing the strengths of signals of adjacent reuse channels received at a point to determine whether a strength of a possibly interfering signal is sufficient compared to a strength of a signal serving the point to interfere with the signal serving the point.

5. A computer implemented process as claimed in claim 1 in which the step of identifying sites transmitting signals likely to serve each of the plurality of points comprises selecting from among signals strong enough to serve a point based on criteria in addition to signal strength to determine a site serving a point in a mobile communications system.

6. A computer implemented process as claimed in claim 5 in which the step of selecting from among signals strong enough to serve a point based on criteria in addition to signal strength to determine a site serving a point in a mobile communications system comprises using network configuration and control information as criteria.

7. A computer implemented process comprising the steps of:
    furnishing data indicating the actual strengths of all signals on reuse channels planned to be implemented to be transmitted between a plurality of cells each positioned at an individual physical position in a mobile communications system and a mobile unit at a plurality of points of an entire mobile communications system in the absence of other signals on the same channel,
    relating data indicating the actual strengths of all signals to the physical positions from which the signals are to be transmitted,
    identifying cells transmitting signals able to serve each point of the plurality of points,
    comparing planned channels to be used at any position serving a point with planned channels to be used at other positions to identify cells transmitting signals which might interfere with signals transmitted by cells serving a point, and determining whether planned channels to be used at any position serving a point interfere with planned channels to be used at other positions over the entire mobile communications system.

8. A computer implemented process as claimed in claim 7 in which the step of determining whether planned channels to be used at any position serving a point interfere with planned channels to be used at other positions over the entire mobile communications system comprises the steps of:

comparing the data indicating the actual strengths of all signals received at each point from different cells on channels which might interfere with signals transmitted by cells serving a point, determining whether interference exists for signals on the same channels of a first strength compared to signals from a cell serving a point, and determining whether interference exists for adjacent signals on the same channels of a second strength compared to signals from a cell serving a point.

9. A computer implemented process as claimed in claim 8 in which the step of furnishing data indicating the actual strengths of all signals to be transmitted between a plurality of cells each positioned at an individual physical position in a mobile communications system and a mobile unit at a plurality of points of an entire mobile communications system comprises:

combining data from different tests, and normalizing data accumulated in different tests indicating the actual strengths of all signals received at each point.

10. A computer implemented process as claimed in claim 8 in which the step of furnishing data indicating the actual strengths of all signals to be transmitted between a plurality of cells each positioned at an individual physical position in a mobile communications system and a mobile unit at a plurality of points of an entire mobile communications system comprises:

adjusting the levels of signal strength measuring uplink data to match signal strengths of downlink data.

11. A computer implemented process as claimed in claim 7 in which the step of furnishing data indicating the actual strengths of all signals on reuse channels planned to be implemented to be transmitted between a plurality of cells each positioned at an individual physical position in a mobile communications system and a mobile unit at a plurality of points of an entire mobile communications system comprises:

transmitting signals on individual channels from each position at which a cell might be placed in an area, receiving the signals transmitted on individual channels from each position at which a cell might be placed in an area at a single mobile unit using a scanning receiver, and recording strength values for the signals received at the mobile unit with data indicating the position of the mobile unit.

12. A computer implemented process as claimed in claim 7 in which the step of furnishing data indicating the actual strengths of all signals to be transmitted between a plurality of cells each positioned at an individual physical position in a mobile communications system and a mobile unit at a plurality of points of an entire mobile communications system comprises:

transmitting signals over the entire area on one frequency from a single mobile unit, receiving the signals transmitted from the mobile unit at each position at which a cell might be placed in the area, and recording strength values for the signals received from the mobile unit and data indicating the position of the mobile unit.

13. A computer implemented process as claimed in claim 12 in which the step of recording strength values for the signals received from the mobile unit and data indicating the position of the mobile unit records data indicating the position of the mobile unit at the mobile unit.

14. A computer implemented process as claimed in claim 12 in which the step of recording strength values for the signals received from the mobile unit and data indicating the position of the mobile unit records data indicating the position of the mobile unit at each cell.

15. A computer implemented process as claimed in claim 12 in which the data indicating the position of the mobile unit comprises a time at which data is transmitted.

16. A computer implemented process as claimed in claim 12 in which the data indicating the position of the mobile unit comprises a physical position of the mobile unit.

17. A computer implemented process as claimed in claim 7 comprising the further step of changing cell configuration parameters to be used at any position serving a point if interference exists until interference has been eliminated.

* * * * *